US012598366B2

(12) United States Patent
Noto et al.

(10) Patent No.: US 12,598,366 B2
(45) Date of Patent: Apr. 7, 2026

(54) CONTENT DATA PROCESSING METHOD AND CONTENT DATA PROCESSING APPARATUS

(71) Applicant: YAMAHA CORPORATION, Hamamatsu (JP)

(72) Inventors: Kentaro Noto, Hamamatsu (JP); Katsumi Ishikawa, Hamamatsu (JP); Futoshi Shirakihara, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 92 days.

(21) Appl. No.: 18/463,427

(22) Filed: Sep. 8, 2023

(65) Prior Publication Data

US 2023/0421865 A1 Dec. 28, 2023

Related U.S. Application Data

(63) Continuation of application No. PCT/JP2022/003948, filed on Feb. 2, 2022.

(30) Foreign Application Priority Data

Mar. 11, 2021 (JP) ................................. 2021-038877

(51) Int. Cl.
*H04N 21/845* (2011.01)
*H04N 21/2187* (2011.01)

(52) U.S. Cl.
CPC ..... *H04N 21/8456* (2013.01); *H04N 21/2187* (2013.01)

(58) Field of Classification Search
CPC ........... H04N 21/8456; H04N 21/2187; H04N 9/8205; H04N 21/23424; H04N 21/8547;
(Continued)

(56) References Cited

U.S. PATENT DOCUMENTS

2005/0141353 A1 6/2005 Takahashi et al.
2007/0214471 A1 9/2007 Rosenberg
(Continued)

FOREIGN PATENT DOCUMENTS

EP 3758385 A1 12/2020
JP 2004021844 A 1/2004
(Continued)

OTHER PUBLICATIONS

English Translation of Chinese Publication CN112351295 (Year: 2021).*
(Continued)

*Primary Examiner* — Loi H Tran
(74) *Attorney, Agent, or Firm* — ROSSI, KIMMS & McDOWELL LLP

(57) ABSTRACT

A content data processing method generates a first-time code indicating an elapsed time from a start of the live event, generates first content data from first data, which includes the one of the audio or video data, received from the live event by adding, to the first data, the first-time code with a first start time and a first end time associated with the first data, and generates a second-time code indicating a duration associated with the first data reflecting the first start time and the first end time.

15 Claims, 18 Drawing Sheets

(58) Field of Classification Search
CPC . H04N 21/242; G11B 27/031; G11B 27/3036
USPC ........................................................ 386/241
See application file for complete search history.

(56) References Cited

U.S. PATENT DOCUMENTS

| | | | |
|---|---|---|---|
| 2013/0014139 A1 | 1/2013 | Kawakami et al. | |
| 2016/0141001 A1* | 5/2016 | Jaime ................... | H04N 9/8211 |
| | | | 386/241 |
| 2021/0067890 A1 | 3/2021 | Tsuge | |
| 2021/0144433 A1* | 5/2021 | Suzuki ............. | H04N 21/43072 |
| 2022/0248080 A1* | 8/2022 | Strickland ............ | H04N 21/242 |
| 2024/0073473 A1* | 2/2024 | Nasir ................... | H04N 21/488 |

FOREIGN PATENT DOCUMENTS

| | | |
|---|---|---|
| JP | 2010219733 A | 9/2010 |
| JP | 5109496 B2 | 12/2012 |
| JP | 2013021466 A | 1/2013 |
| JP | 2016111492 A | 6/2016 |
| WO | 2020187408 A1 | 9/2020 |

OTHER PUBLICATIONS

WO 2018008383 Jan. 2018 (Year: 2018).*
Extended European Search Report issued in European Appln. No. 22766683.1, mailed Jan. 17, 2025.
English translation of Written Opinion issued in Intl. Appln. No. PCT/JP2022/003948 mailed on May 10, 2022, previously cited in IDS filed Sep. 8, 2023.
International Preliminary Report on Patentability issued in Intl. Appln. No. PCT/JP2022/003948 on Sep. 12, 2023. English translation provided.
International Search Report issued in Intl. Appln. No. PCT/JP2022/003948 mailed May 10, 2022. English translation provided.
Written Opinion issued in Intl. Appln. No. PCT/JP2022/003948 mailed May 10, 2022.
Communication pursuant to Article 94(3) EPC issued in European Appln. No. 22766683.1 mailed Nov. 19, 2025.

* cited by examiner

| CONTENT DATA PROCESSING APPARATUS | 10A |
| CONTENT DATA PROCESSING APPARATUS | 10B |
| CONTENT DATA PROCESSING APPARATUS | 10C |

5

CONTENT DATA PROCESSING APPARATUS      10

AUDIO DATA

| FIRST SONG 00:00:30- 00:04:30 | PERFORMANCE AUDIO DATA |
|---|---|

FIG.9

| TIME DATA<br>00:01:00-<br>00:04:30 | FIRST-SONG AUDIO DATA |
|---|---|

| TIME DATA<br>00:00:30-<br>00:01:30 | PRODUCTION 1 AUDIO DATA |
|---|---|

| TIME DATA<br>00:01:40-<br>00:02:40 | PRODUCTION 2 AUDIO DATA |
|---|---|

| TIME DATA<br>00:05:30-<br>00:08:30 | SECOND-SONG AUDIO DATA |
|---|---|

| TIME DATA<br>00:00:30-<br>00:01:00 | PRODUCTION 3 AUDIO DATA |
|---|---|

FIG.10

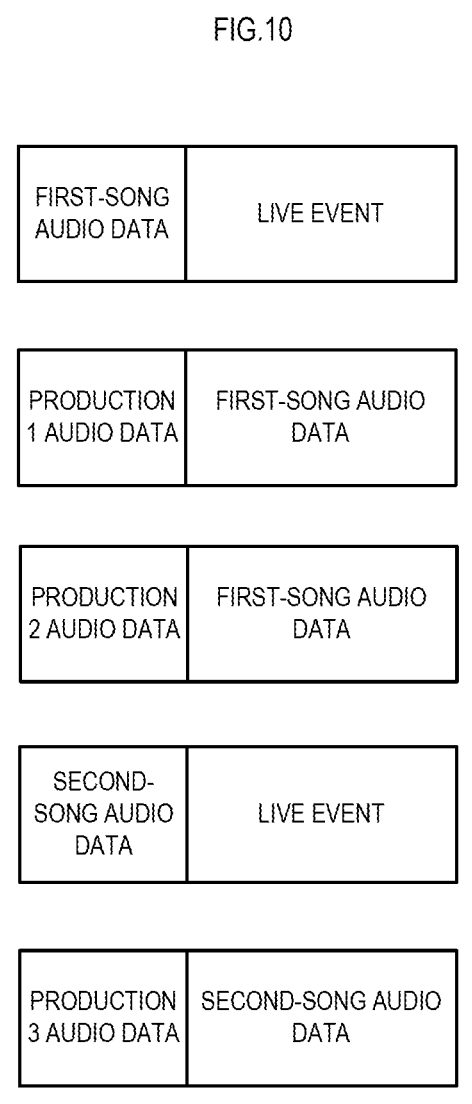

| FIRST-SONG AUDIO DATA | LIVE EVENT |

| PRODUCTION 1 AUDIO DATA | FIRST-SONG AUDIO DATA |

| PRODUCTION 2 AUDIO DATA | FIRST-SONG AUDIO DATA |

| SECOND-SONG AUDIO DATA | LIVE EVENT |

| PRODUCTION 3 AUDIO DATA | SECOND-SONG AUDIO DATA |

FIG.12

| FIRST-SONG AUDIO DATA | LIVE EVENT |
| --- | --- |

| PRODUCTION 1 AUDIO DATA | FIRST-SONG AUDIO DATA |
| --- | --- |

| PRODUCTION 2 AUDIO DATA | SECOND-SONG AUDIO DATA |
| --- | --- |

| SECOND-SONG AUDIO DATA | LIVE EVENT |
| --- | --- |

| PRODUCTION 3 AUDIO DATA | SECOND-SONG AUDIO DATA |
| --- | --- |

FIG.14

| TIME DATA 00:05:30- 00:08:30 | FIRST-SONG AUDIO DATA |
|---|---|

| TIME DATA 00:00:30- 00:01:30 | PRODUCTION 1 AUDIO DATA |
|---|---|

| TIME DATA 00:01:40- 00:02:40 | PRODUCTION 2 AUDIO DATA |
|---|---|

| TIME DATA 00:01:00- 00:04:30 | SECOND-SONG AUDIO DATA |
|---|---|

| TIME DATA 00:00:30- 00:01:00 | PRODUCTION 3 AUDIO DATA |
|---|---|

FIG.17

| LIVE 1 FIRST SONG | VOCAL 1 DATA |
|---|---|

| LIVE 1 FIRST SONG | GUITAR 1 DATA |
|---|---|

| LIVE 1 FIRST SONG | BASS 1 DATA |
|---|---|

| LIVE 1 SECOND SONG | VOCAL 1 DATA |
|---|---|

⋮

| LIVE 2 FIRST SONG | VOCAL 2 DATA |
|---|---|

| LIVE 2 FIRST SONG | GUITAR 2 DATA |
|---|---|

| LIVE 2 FIRST SONG | BASS 2 DATA |
|---|---|

| LIVE 2 SECOND SONG | VOCAL 3 DATA |
|---|---|

FIG.18

| LIVE 1 FIRST SONG | VOCAL 1 DATA |
|---|---|
| LIVE 2 FIRST SONG | GUITAR 2 DATA |
| LIVE 2 FIRST SONG | BASS 2 DATA |

| LIVE 2 SECOND SONG | VOCAL 3 DATA |
|---|---|
| LIVE 1 SECOND SONG | GUITAR 1 DATA |
| LIVE 1 SECOND SONG | BASS 1 DATA |

CONTENT DATA PROCESSING METHOD AND CONTENT DATA PROCESSING APPARATUS

CROSS REFERENCE TO RELATED APPLICATIONS

The present application is a continuation application of International Patent Application No. PCT/JP2022/003948, filed on Feb. 2, 2022, which claims priority to Japanese Patent Application No. 2021-038877, filed on Mar. 11, 2021. The contents of these applications are incorporated herein by reference in their entirety.

BACKGROUND

Technical Field

An embodiment of the present disclosure relates to a content data processing method and a content data processing apparatus that process content data.

Background Information

Japanese Unexamined Patent Application Publication No. 2016-111492 discloses a terminal device that synchronizes progress timing between a video and content to be reproduced by a television receiver.

The synchronization of a plurality of data is performed by use of a time code, for example, as shown in Japanese Unexamined Patent Application Publication No. 2004-21844.

SUMMARY

In a live event, various data such as voice of a host, a singing sound, a performance sound, a video image, or production is generated at various timing. Therefore, the management of editing or reproducing the data related to the live event becomes complicated. For example, in the second performance from the start of the live event, when a certain performance occurs at certain timing, it is difficult to determine how much time has elapsed since the start timing of the second performance, based only on the time code that indicates how much time has elapsed since the start of the live event.

An object of an embodiment of present disclosure aims to provide a content data processing method and a content data processing apparatus that facilitate management of a plurality of data according to a live event.

A content data processing method according to an embodiment of the present disclosure generates a first-time code indicating an elapsed time from a start of the live event, generates first content data from first data, which includes the one of the audio or video data, received from the live event by adding, to the first data, the first-time code with a first start time and a first end time associated with the first data, and generates a second-time code indicating a duration associated with the first data reflecting the first start time and the first end time.

According to an embodiment of the present disclosure, a plurality of data according to a live event is easily manageable.

BRIEF DESCRIPTION OF THE DRAWINGS

FIG. 1 is a block diagram showing a configuration of a content data processing system 1.

FIG. 5 is a view showing a relationship among a time code, audio data, and time.

FIG. 6 is a view showing an example of a structure of third audio data.

FIG. 9 is a view showing an example of a structure of audio data according to an application example.

FIG. 10 is a conceptual diagram showing related information according to the application example.

FIG. 12 is a view showing an example of the structure of the related information.

FIG. 14 is a view showing an example of the structure of the audio data according to the application example.

FIG. 17 is a view showing an example of audio data that the content data processing apparatus 10 obtains in Modification 2.

FIG. 18 is a view showing an example of combination of audio data.

DETAILED DESCRIPTION

FIG. 1 is a block diagram showing a configuration of a content data processing system 1. The content data processing system 1 includes a content data processing apparatus 10, a content data processing apparatus 10A, a content data processing apparatus 10B, and a content data processing apparatus 10C. The content data processing apparatus 10, the content data processing apparatus 10A, the content data processing apparatus 10B, and the content data processing apparatus 10C are each connected through the Internet 5.

The content data processing apparatus 10, the content data processing apparatus 10A, the content data processing apparatus 10B, and the content data processing apparatus 10C each includes an information processing apparatus such as a personal computer.

The content data processing apparatus 10 is installed, for example in a venue of a live event. The content data processing apparatus 10A, the content data processing apparatus 10B, and the content data processing apparatus 10C are installed mainly in a venue different from the venue of a live event or in a house of a participant who watches the live event in a remote place.

Figure 2:
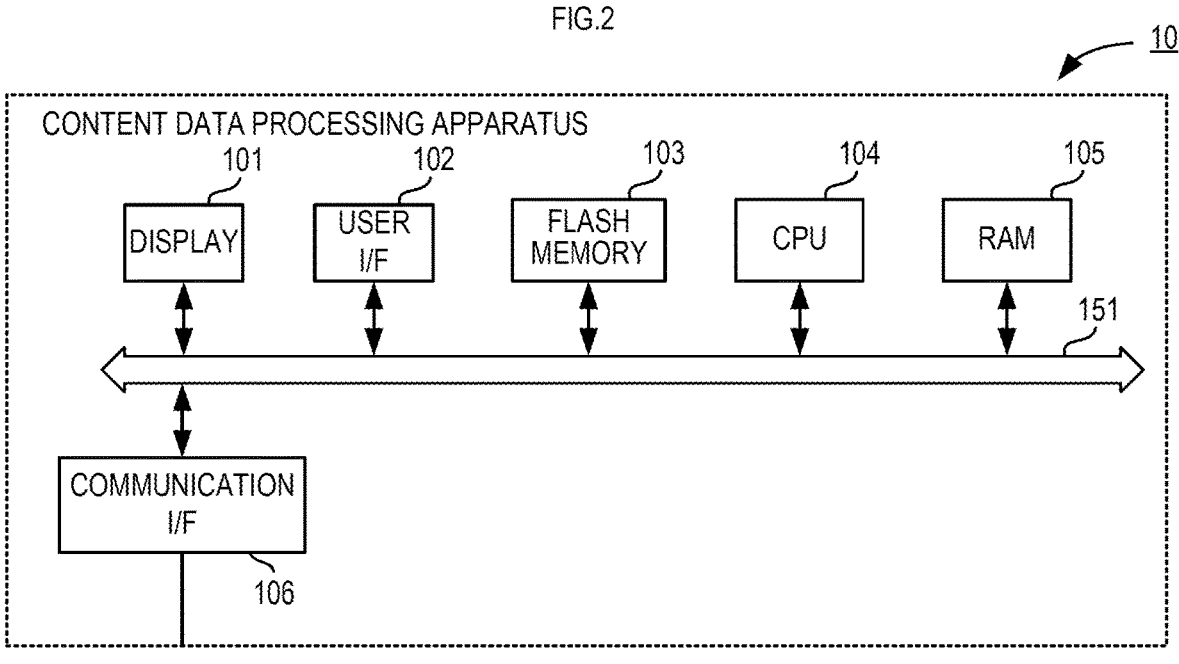
FIG. 2 is a block diagram showing a main configuration of a content data processing apparatus 10.

FIG. 2 is a block diagram showing a main configuration of the content data processing apparatus 10. The content data processing apparatus 10 includes a display 101, a user interface (I/F) 102, a flash memory 103, a CPU 104, a RAM 105, and a communication interface (I/F) 106. It is to be noted that the content data processing apparatus 10A, the content data processing apparatus 10B, and the content data processing apparatus 10C have the same or similar hardware configuration as the content data processing apparatus 10. Therefore, the description of the hardware configuration of the content data processing apparatus 10A, the content data processing apparatus and the content data processing apparatus 10C will be omitted.

The display 101 is made of an LCD (Liquid Crystal Display) or an OLED (Organic Light-Emitting Diode), for example, and displays various types of information. The user I/F 102 includes a switch, a keyboard, a mouse, a trackball, or a touch panel, and receives an operation from a user. In a case in which the user I/F 102 is a touch panel, the user I/F 102 constitutes a GUI (Graphical User Interface, the rest is omitted) together with the display 101.

The communication I/F 106 is connected to various devices through a communication line such as a USB cable, HDMI (registered trademark), Ethernet (registered trademark), or MIDI. For example, the content data processing apparatus 10 is connected to an audio mixer that processes the sound of a live event through the communication I/F 106. The content data processing apparatus 10 receives the audio data related to the live event from the audio mixer. The audio data related to the live event includes voice of a host, a singing sound, a performance sound, an audio signal of a production sound, for example. The production sound also includes a sound effect such as applause, a shout, or an explosion sound, for example.

The audio data may be audio data including all the audio signals that are generated in the live event, such as an audio signal of a singing sound, an audio signal of a performance sound, and an audio signal of a production sound, or may be audio data separately including each of the audio signal of a singing sound, the audio signal of a performance sound, and the audio signal of a production sound. In addition, the audio data of a singing sound may also be audio data including the singing sound of all singers, or may be audio data respectively and individually including the singing sound of each singer. In addition, the audio data of a performance sound may also be audio data including a performance sound of all musical instruments, or may be audio data respectively and individually including the performance sound of each musical instrument.

The CPU 104 reads a program stored in the flash memory 103 being a storage medium to the RAM 105 and implements a predetermined function. For example, the CPU 104 displays an image for receiving an operation from the user on the display 101, and, by receiving an operation such as a selection operation to the image through the user I/F 102, implements the GUI.

It is to be noted that the program that the CPU 104 reads does not need to be stored in the flash memory 103 in the own apparatus. For example, the program may be stored in a storage medium of an external apparatus such as a server. In such a case, the CPU 104 may read the program each time from the server to the RAM 105 and may execute the program.

Figure 3:
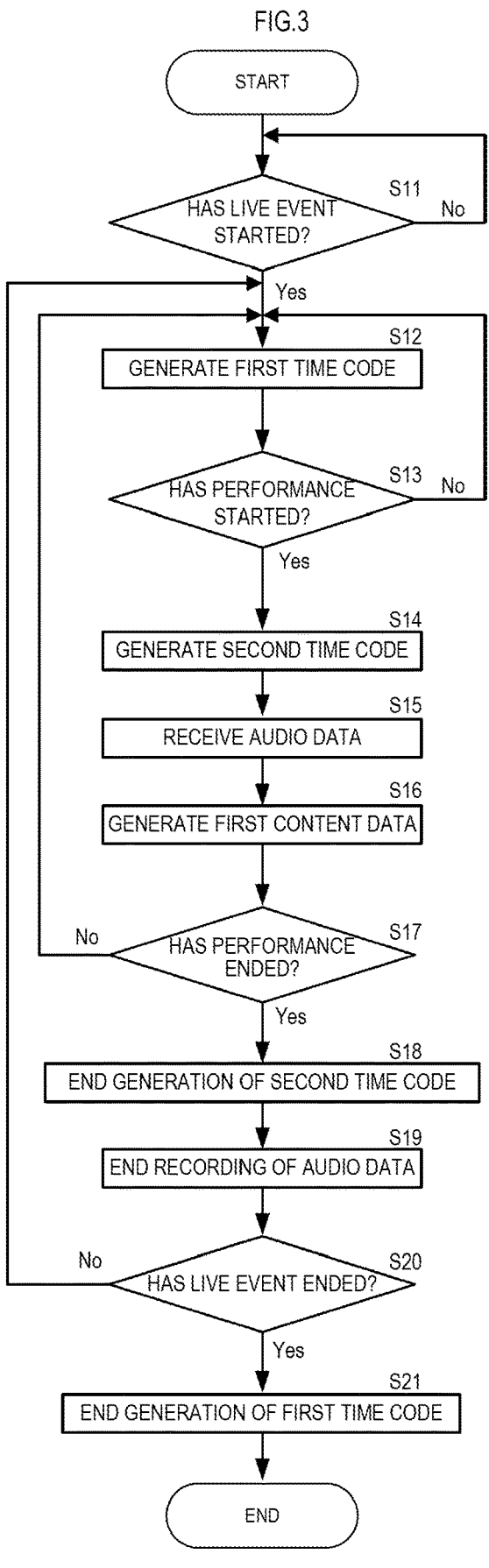
FIG. 3 is a flowchart showing an operation of a CPU 104.

FIG. 3 is a flowchart showing an operation of the CPU 104. The CPU 104 first determines whether or not a live event has started (S11). For example, when an operator who manages the live event directs start of the live event through the user I/F 102, the CPU 104 determines that the live event has started (S11: Yes).

Figure 4:
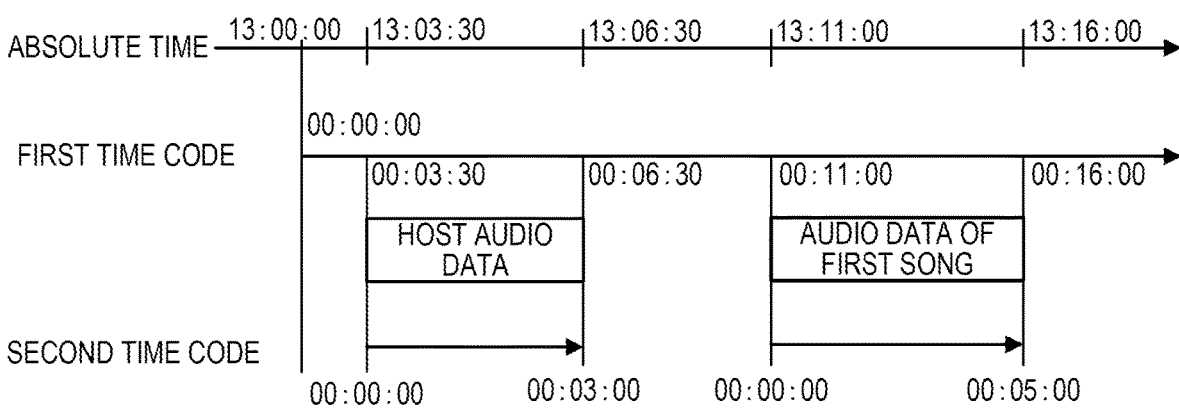
FIG. 4 is a view showing a relationship among a time code, audio data, and time.

The CPU 104, in determining that the live event has started, generates a first time code (S12). FIG. 4 is a view showing a relationship among a time code, audio data, and time. The first time code shows elapsed time from start timing of the live event. In other words, the first time code shows relative time based on the start timing of the live event. In the example of FIG. 4, the live event starts at an absolute time 13:00:00. The first time code serves as a reference time (00:00:00) at the absolute time 13:00:00. In this example, while the CPU 104 generates the first time code at every lapse of one second for the convenience of the description, the CPU 104 may generate the first time code at even shorter time intervals. For example, in a case in which the sampling frequency of an audio signal is 48 kHz, the first time code may also be generated in 48 kHz (20.83 μsec) units.

Next, the CPU 104 determines whether or not a performance in the live event has started (S13). For example, when the operator who manages the live event directs the start of the performance through the user I/F 102, the CPU 104 determines that the performance has started (S13: Yes). The CPU 104 repeats generation of the first time code (S13: No) until the performance in the live event starts.

The CPU 104, in determining that the performance has started, generates a second time code (S14). As shown in FIG. 4, the second time code shows elapsed time from the start timing of each performance in the live event. In other words, the second time code shows relative time based on the start timing of each performance in the live event. In the example of FIG. 4, a performance of speech of the host starts at the absolute time 13:03:30. At this time, the first time code is 00:03:30, and the second time code is 00:00:00. The second time code, while being also generated in one second unit, may be generated, for example, in 48 kHz (20.83 μsec) units.

The CPU 104 receives audio data at the same time as performing generation of the second time code (S15). In other words, the CPU 104 starts recording of audio data (an audio signal such as a sound, a singing sound, a performance sound, a production sound, or the like) related to the live event that is received from the audio mixer. Then, the CPU 104 generates first content data in which time of the first time code is added to recorded audio data (S16). The first content data is data in which a header of time information is added to the audio data (the audio signal such as a sound, a singing sound, a performance sound, a production sound, or the like) related to the live event.

Next, the CPU 104 determines whether or not the performance has ended (S17). For example, when the operator who manages the live event directs the end of the performance through the user I/F 102, the CPU 104 determines that the performance has ended (S17: Yes). The CPU 104, in determining that the performance continues (S17: No), repeats from the processing of S12. The CPU 104, in determining that the performance has ended, ends the generation of the second time code (S18), and stops the recording of the audio data (S19).

In the example of FIG. 4, the performance of the speech of the host ends at the absolute time 13:06:30. At this time, the first time code is 00:06:30, and the second time code is 00:03:00. Accordingly, the generation of the first content data according to the speech of the host is completed.

Subsequently, the CPU 104 determines whether or not the live event has ended (S20). For example, when the operator who manages the live event directs the end of the live event through the user I/F 102, the CPU 104 determines that the live event has ended (S20: Yes). The CPU 104, in determining that the live event continues (S20: No), repeats from the processing of S12. The CPU 104, in determining that the live event has ended (S20: Yes), ends the generation of the first time code (S21), and ends the operation.

In the example of FIG. 4, a performance of a musical performance of the first song starts at the absolute time 13:11:00, as the next performance of the speech of the host. The CPU 104, in repeating from the processing of S12, generates the first content data according to the performance sound of the first song, and performs the generation of the second time code. At this time, the first time code is 00:11:00, and the second time code is 00:00:00. The CPU 104 restarts the generation of the second time code and receives the audio data (S15). Then, the CPU 104 generates first content data in which time of the first time code is added to the recorded audio data (S16). The first content data generated herein is data in which the header of the time information is added to the audio data of the performance sound of the first song. The performance of the musical performance of the first song ends at the absolute time 13:16:00. At this time, the first time code is 00:16:00, and the second time code is 00:05:00. Accordingly, the generation of the first content data according to the performance sound of the first song, the first content data being adding with the time information of the first time code of the start time and the end time 00:16:00, is completed.

In this way, the content data processing apparatus generates the first time code that indicates elapsed time from the start timing of the live event, generates the first content data added with the time of the first time code, and further generates the second time code that indicates elapsed time from the start timing of the performance corresponding to each first content data. Although the example of FIG. 4 shows only two performances, in an actual live event, various data such as voice of a host, a singing sound, a performance sound, a video image, or production is generated at various timing. Therefore, hypothetically, without the second time code, the management of editing or reproducing the data related to the live event becomes complicated. For example, in the performance of the first song of FIG. 4, when certain production occurs at certain timing, it is difficult to determine that the performance occurs at which point how much time has elapsed since the start timing of the performance of the first song, based only on the first time code from the start of the live event. However, the content data processing apparatus 10 according to the present embodiment, since generating the second time code that indicates the elapsed time from the start timing of each performance, is able to easily determine that the performance occurs at which point how much time has elapsed since the start timing of the performance of the first song.

Figure 5:
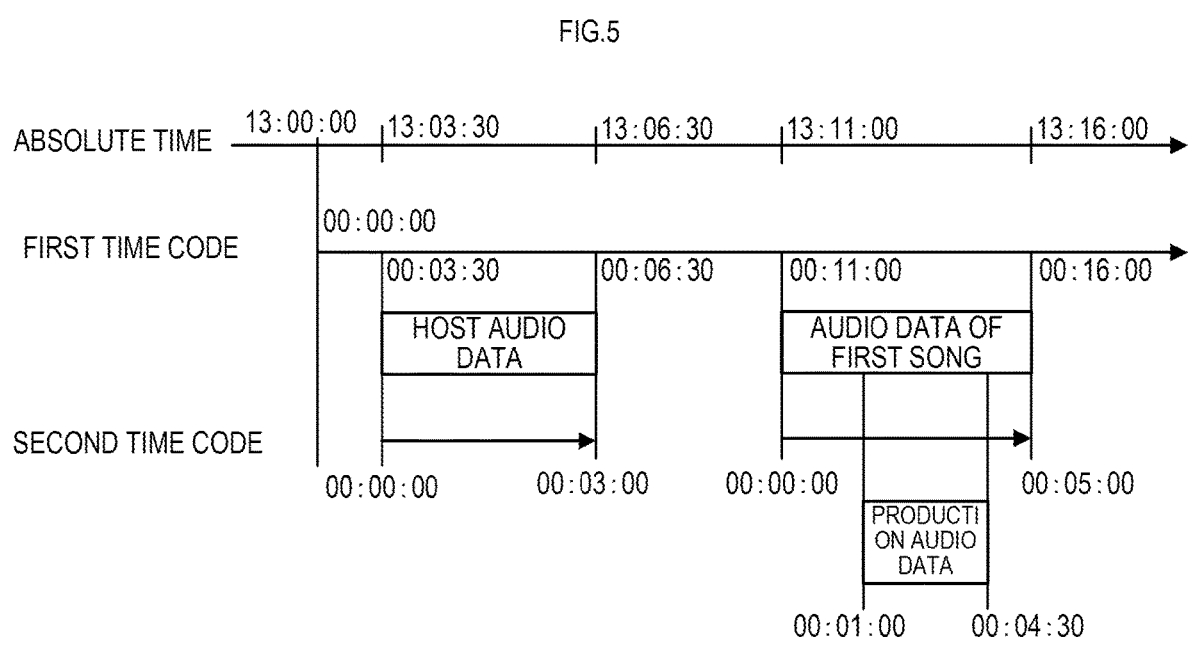

In the example of FIG. 4, the audio data of the performance of the first song is audio data including the audio signal of a singing sound, the audio signal of a performance sound, and the audio signal of a production sound. However, the audio data may separately include, for example, first audio data including the audio signal of a singing sound, and the audio signal of a performance sound and second audio data including the audio signal of a production sound. FIG. 5 is a view showing a relationship among a time code, audio data, and time in a case in which the production sound is received as the second audio data.

In the example of FIG. 5, a production sound occurs one minute after performance start timing of the first song. For example, the operator who manages the live event directs the start of the production sound through the user I/F 102. The CPU 104 of the content data processing apparatus 10 receives the second audio data of the production sound and generates second content data in which time of the second time code is added to the second audio data of the production sound. Accordingly, the second content data according to the production sound, the second content data being adding with the time information of the second time code of the start time 00:01:00 and the end time 00:04:30, is generated. It is to be noted that another production sound (a second production sound) or the like related to the production sound (a first production sound) further occurs while the production sound is ringing, the content data processing apparatus 10 may further receive the second audio data of the second production sound and may generate the second content data in which time of the second time code is added to the audio data of the second production sound. Alternatively, the content data processing apparatus 10 may further generate a third time code that indicates an elapsed time from the start timing of the first production sound and may generate third content data in which time of the third time code is added to the audio data of the second production sound.

The content data processing apparatus 10 distributes the first time code, the first content data (audio data of the host and audio data of the first song), and the second time code that are shown in FIG. 4. Alternatively, the content data processing apparatus 10 distributes the first time code, the first content data (audio data of the host and audio data of the first song), the second time code, and the second content data that are shown in FIG. 5.

In the example of the configuration of FIG. 1, the content data processing apparatus 10 distributes various data to the content data processing apparatus 10A, the content data processing apparatus 10B, and the content data processing apparatus 10C, through the Internet 5.

The content data processing apparatus 10A, the content data processing apparatus 10B, and the content data processing apparatus 10C each receive the first time code, the first content data, and the second time code. Alternatively, the content data processing apparatus 10A, the content data processing apparatus 10B, and the content data processing apparatus 10C each receive the first time code, the first content data, the second time code, and the second content data.

The content data processing apparatus 10A, the content data processing apparatus 10B, and the content data processing apparatus 10C reproduce the audio data of the host and the audio data of the first song that are included in the first content data, based on the received first time code.

The content data processing apparatus 10A, the content data processing apparatus 10B, and the content data processing apparatus 10C each have different communication environments. Therefore, the content data processing apparatus 10A, the content data processing apparatus 10B, and the content data processing apparatus 10C each have different data receiving timing. Therefore, the absolute time of reproduction start timing of the live event is different for each. However, the content data processing apparatus 10A, the content data processing apparatus 10B, and the content data processing apparatus 10C each reproduce each audio data related to the live event, based on the first time code being the elapsed time from the start timing of the live event. Therefore, in all the apparatuses, the audio data of each performance is reproduced at timing after the same elapsed time from the start of the live event. In addition, the content data processing apparatus 10A, the content data processing apparatus 10B, and the content data processing apparatus 10C, in a case of receiving the second content data, reproduce the second audio data, based on the second time code being the elapsed time from the start timing of each performance. Therefore, in all the apparatuses, the audio data of the production sound is reproduced at timing after the same elapsed time from the start of the performance.

The content data processing apparatus 10A, the content data processing apparatus 10B, and the content data processing apparatus 10C each may reproduce third audio data stored in the own apparatus together with the second audio data or in place of the second audio data. The third audio data may be audio data such as a production sound related to each performance or may be audio data including the audio signal of a performance sound. The content data processing apparatus 10 distributes the third audio data to the content data processing apparatus 10A, the content data processing apparatus 10B, and the content data processing apparatus 10C in advance before the start of the live event.

Figure 6:
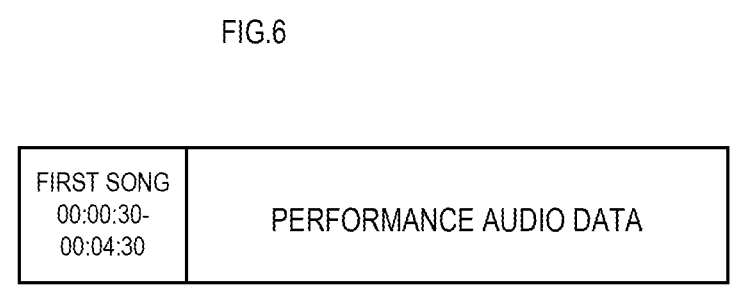

FIG. 6 is a view showing an example of a structure of the third audio data. The third audio data is audio data added with time information of a second time code. In the example of FIG. 6, the third audio data includes time data and performance audio data. The time data includes the time information of a second time code, and the related information that indicates a related destination. The related information is information for identifying the related destination of each third audio data, and, in the example of FIG. 6, information on the first song is included as the related information.

Figure 7:
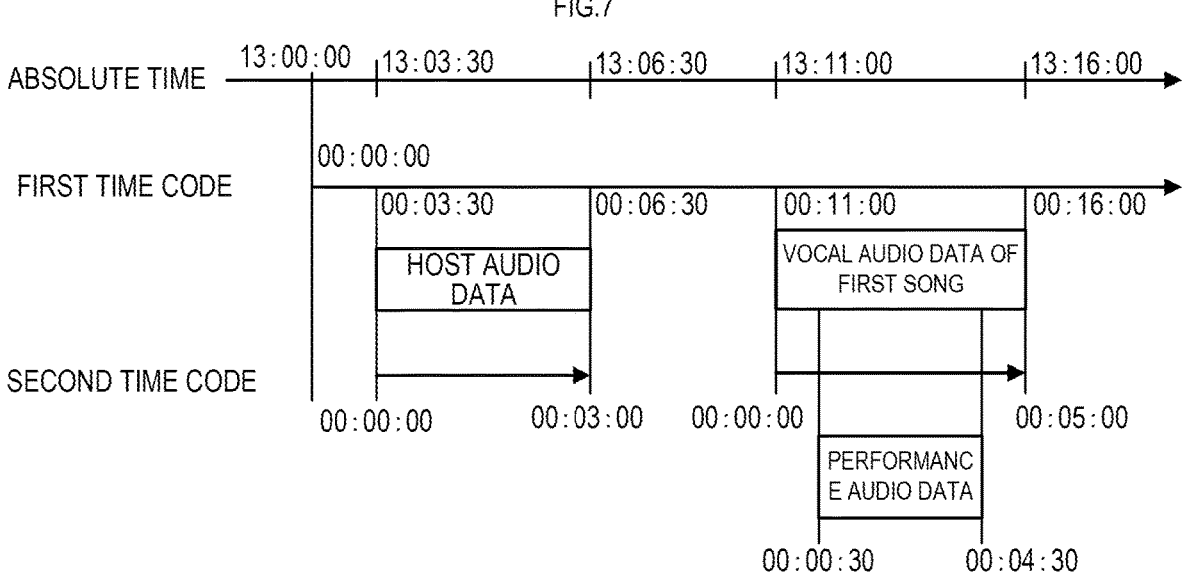
FIG. 7 is a view showing a relationship among a time code, audio data, and time in a case in which the third audio data is reproduced.

FIG. 7 is a view showing a relationship among a time code, audio data, and time in a case in which the third audio data is reproduced. In the example of FIG. 7, the content data processing apparatus 10 distributes first content data according to voice of a host, a first time code, and first content data according to a vocal sound of the first song, a second time code related to the first content data according to the voice of a host, and a second time code related to the first content data according to a vocal sound of the first song.

The content data processing apparatus 10A, the content data processing apparatus 10B, and the content data processing apparatus 10C download the third audio data in advance. The third audio data is audio data of a performance sound excluding the vocal sound of the first song, for example. The third audio data includes information on the first content data according to the vocal sound of the first song as the related information. Therefore, the content data processing apparatus 10A, the content data processing apparatus 10B, and the content data processing apparatus 10C reproduce the vocal sound of the first song included in the first content data based on the first time code, and reproduces the third audio data of the performance sound downloaded in advance, based on the second time code of the first song.

In FIG. 6, as an example, reproduction of the third audio data of the performance sound is started at 00:00:30 of the first song, and the reproduction of the third audio data of the performance sound ends at 00:04:30 of the first song. As a result, the content data processing apparatus 10A, the content data processing apparatus 10B, and the content data processing apparatus 10C each are able to reproduce the performance sound according to the vocal sound of the first song. Therefore, the audio data of each performance is reproduced at timing after the same elapsed time from the start of the live event in all the apparatuses, and the audio data downloaded in advance is reproduced at timing after the same elapsed time from the start of the performance in all the apparatuses.

In the example of FIG. 6 and FIG. 7, the content data processing apparatus 10A, the content data processing apparatus 10B, and the content data processing apparatus 10C do not reproduce the second audio data (production audio data shown in FIG. 5). However, the content data processing apparatus 10 may further distribute the second content data including the second audio data. The content data processing apparatus 10A, the content data processing apparatus 10B, and the content data processing apparatus 10C may further reproduce the second audio data, based on the second time code included in the second sound content data.

The content data processing apparatus 10A, the content data processing apparatus 10B, and the content data processing apparatus 10C may store the distributed audio data of the live event. A user of the content data processing apparatus 10A, the content data processing apparatus 10B, and the content data processing apparatus 10C can reproduce the live event held in the past at a favorite time. In addition, the user of the content data processing apparatus 10A, the content data processing apparatus 10B, and the content data processing apparatus 10C can also edit the audio data of the live event. For example, when the start time of the audio data of the first song shown in FIG. 5 is changed to 00:15:00, the performance of the first song is started at 00:15:00 from the start of the live event. Even when the start time of the audio data of the first song is changed, the audio data of the production sound related to the first song starts at timing of 00:01:00 from start of reproduction of the first song. In addition, the user may cut out and reproduce only any portion of any song. For example, the user can cut out only a portion of the performance of the audio data of the first song by specifying the second time code from 00:01:00 to 00:03:00 of the audio data of the first song in the example of FIG. 5. In addition, the user can also switch the order of the songs by switching the audio data of the first song and the audio data of the second song. In this case as well, the audio data of the production sound related to each of the first song and the second song is reproduced at timing after a predetermined time from the reproduction start timing of each song. In addition, the user may extract any song of a plurality of live events and may combine the audio data of favorite songs. Therefore, the content data processing system 1 according to the present embodiment is able to easily manage and edit each data of a live event. The content data processing system 1 according to the present embodiment is also able to create a user-specific live event by extracting any song of the plurality of live events or cutting out only any portion.

The content data processing apparatus 10A, the content data processing apparatus 10B, and the content data processing apparatus 10C may receive a reaction of each user (participant in the live event). The content data processing apparatus 10A, the content data processing apparatus 10B, and the content data processing apparatus 10C generate reaction data in which the first time code or the second time code is added to information corresponding to the received reaction.

The content data processing apparatus 10A, the content data processing apparatus 10B, and the content data processing apparatus 10C, for example, displays an icon image such as "cheer," "applause," "call," and "murmur" on the display 101, and, by receiving an operation to select these icon images from the user through the user I/F 102, receives the reaction.

The content data processing apparatus 10A, the content data processing apparatus 10B, and the content data processing apparatus 10C generate the information corresponding to the received reaction and generate the reaction data in which the first time code or the second time code is added to the generated reaction information. The content data processing apparatus 10A, the content data processing apparatus 10B, and the content data processing apparatus 10C send the reaction data to the content data processing apparatus 10 or other aggregation servers. The content data processing apparatus 10 or the aggregation servers receive and aggregate the reaction data from a plurality of participants. The operator of an event, by using an apparatus that aggregates the reaction data, can analyze at what time of the live event or at what time of which performance excitement is generated.

The reaction data may be text information or may be position information, sound information, biological information, or motion information, for example. When the reaction data includes text information, the apparatus that aggregates the reaction data can extract, for example, a specific word (a keyword) from the text information. In addition, the apparatus that aggregates the reaction data, in a case of extracting the same word from a plurality of apparatuses, can extract the word as a trend word. As a result, the operator of the event, with reference to the content of a text, can analyze at what time of the live event or at what time of which performance what emotions the participants receive.

The position information includes GPS data of an apparatus that has generated a reaction or an IP address of an access point in wireless communication. The operator of the live event can analyze at what time of the live event or at what time of which performance in which area excitement is generated.

The sound information is audio data obtained by recording voice that the participants have uttered, such as "cheer," "applause," "call," and "murmur." The apparatus that aggregates the reaction data is able to analyze a change in volume, voice quality, voice tone, or the like of the participants.

The biological information is information including an amount of perspiration, a heart rate, or blood pressure that are obtained by a sensor worn by the participants. The apparatus that aggregates the reaction data can analyze whether or not at what time of the live event or at what time of which performance excitement is generated.

The motion information is, for example, viewpoint information detected by a head tracker or a camera of a mobile terminal owned by the user, or movement information of the participants detected by an acceleration sensor or the like of the mobile terminal. The movement information of the participants may be detected by an acceleration sensor built into a penlight used in the live event. The apparatus that aggregates the reaction data can analyze at what time of the live event or at what time of which performance how each participant performs the movement.

Figure 8:
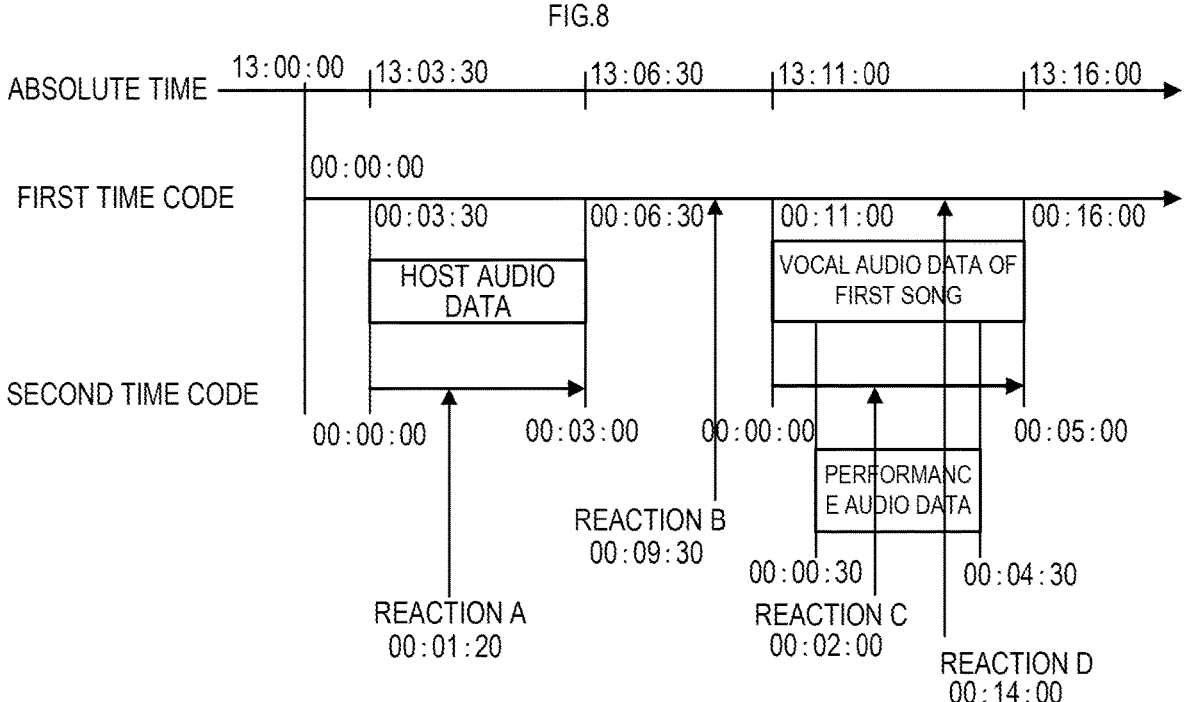
FIG. 8 is a view showing a relationship among a time code, audio data, and time in a case in which reaction data is aggregated.

FIG. 8 is a view showing a relationship among a time code, audio data, and time in a case in which the reaction data is aggregated. In the example of FIG. 8, the content data processing apparatus 10 receives four reactions of a reaction A, a reaction B, a reaction C, and a reaction D.

The reaction A occurs at timing of 00:01:20 from the start of the performance of the speech of the host. Therefore, the content data processing apparatus 10 receives the reaction data of the reaction A that includes the time information of as the time information of the second time code of the speech of the host. The reaction B occurs at timing of 00:09:30 from the start of the live event. Therefore, content data processing apparatus 10 receives the reaction data of the reaction B that includes the time information of 00:09:30 as the time information of the first time code. The reaction C occurs at timing of 00:02:00 from the start of the performance of the first song. Therefore, the content data processing apparatus receives the reaction data of the reaction C that includes the time information of 00:02:00 as the time information of the second time code of the first song. The reaction D occurs at timing of 00:03:00 from the start of the performance of the first song. However, in this case, the content data processing apparatus 10 receives the reaction data of the reaction D that includes the time information of 00:14:00 as the time information of the first time code. In this way, when a reaction occurs while the performance occurs, the time information included in the reaction data may be the time information of the first time code or may be the time information of the second time code. In addition, when a reaction occurs while the performance occurs, the time information of the reaction data may include both the time information of the first time code and the time information of the second time code.

The reaction data, since including the time information of the first time code or the second time code, even when delay on communication of each apparatus occurs, is able to accurately determine at what time of the live event or at what time of which performance the reaction data occurs. As a result, the operator of the live event, by referring to an aggregation result of the reaction data, can determine at what time of the live event or at what time of which performance excitement is increased. The operator of the live event can utilize reference to such an aggregation of the reaction data for consideration of organization, production, or the like of the next live event.

It is to be noted that the content data processing apparatus 10A, the content data processing apparatus 10B, and the content data processing apparatus 10C may record the absolute time of each of the timing when the first audio data is reproduced, the timing when the second audio data is reproduced, the timing when the third audio data is reproduced, or the timing when the reaction data is received, and may send to the content data processing apparatus 10 or the aggregation server. The content data processing apparatus 10 or the aggregation server, by determining a difference between the absolute time of the timing when the data is distributed and the absolute time received from the content data processing apparatus 10A, the content data processing apparatus 10B, and the content data processing apparatus 10C, is able to estimate delay time on communication from distribution of data to each apparatus to reception.

Next, an application example of the related information will be described. FIG. 9 is a view showing an example of a structure of audio data according to the application example. The audio data, as described above, is added with the time information of the first time code or the time information of the second time code. The audio data is downloaded in advance from the content data processing apparatus 10 installed in the venue of the live event. The audio data shown in FIG. 6 includes the related information that indicates a related destination as a header. However, in the application example, the related information is recorded as other data.

Figure 11:
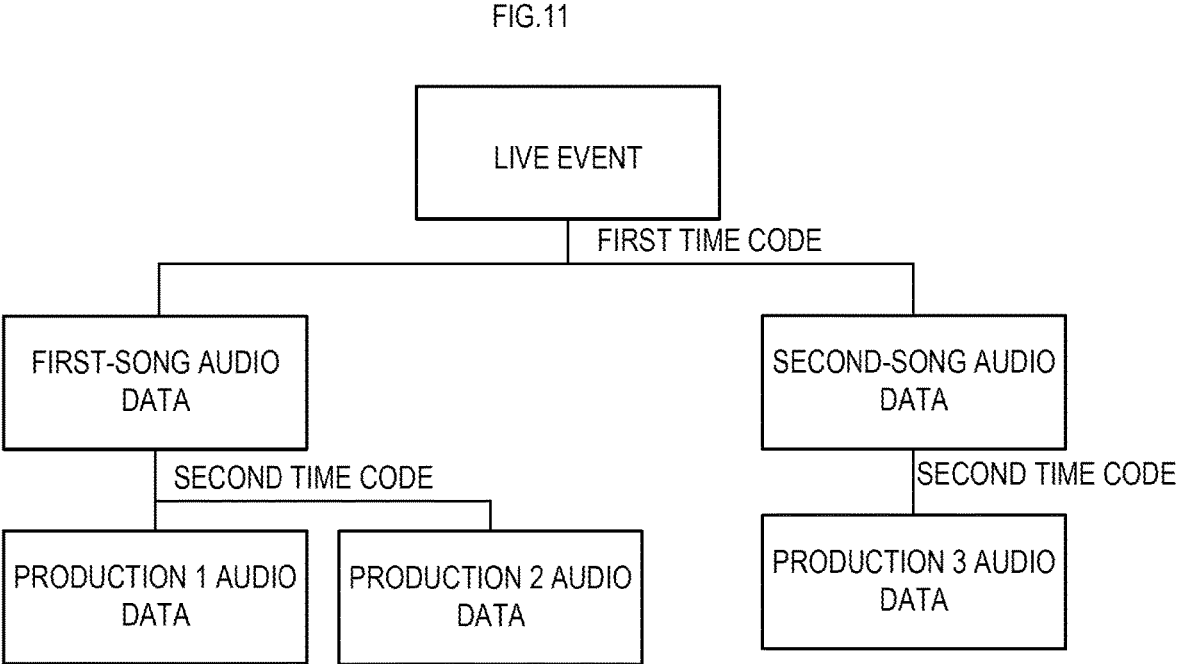
FIG. 11 is a view showing an example of a structure of the related information according to the application example.

FIG. 10 is a view showing an example of a structure of the related information according to the application example. FIG. 11 is a conceptual diagram showing a hierarchical structure of the related information according to the application example. As shown in FIG. 11, for example, the related information on the audio data of the first song registers the live event related to the first time code as the related destination. The related information on the audio data of the second song also registers the live event related to the first time code as the related destination. On the other hand, in the related information on the audio data of production 1, the audio data of the first song related to the second time code is registered as the related destination. In the related information on the audio data of production 2, the audio data of the first song related to the second time code is registered as the related destination. In the related information on the audio data of production 3, the audio data of the second song related to the second time code is registered as the related destination. Therefore, the related information has a hierarchical structure as shown in FIG. 11.

In the example of FIG. 10, the apparatus (the content data processing apparatus 10A, the content data processing apparatus 10B, and the content data processing apparatus 10C, for example) that reproduces content data reproduces the audio data of the first song at 00:01:00 from the start timing of the live event, and ends reproduction of the audio data of the first song at 00:04:30. The apparatus (hereinafter, referred to as a reproduction apparatus) that reproduces content data reproduces the audio data of the production 1 at 00:00:30 from the reproduction start timing of the first song, and ends reproduction of the audio data of the production 1 at 00:01:30. The reproduction apparatus reproduces the audio data of the production 2 at 00:01:40 from the reproduction start timing of the first song, and ends reproduction of the audio data of the production 2 at 00:02:40. The reproduction apparatus reproduces the audio data of the second song at 00:05:30 from the start timing of the live event, and ends reproduction of the audio data of the second song at 00:08:30. The reproduction apparatus reproduces the audio data of the production 3 at 00:00:30 from the reproduction start timing of the second song, and ends reproduction of the audio data of the production 3 at 00:01:00.

Figure 13:
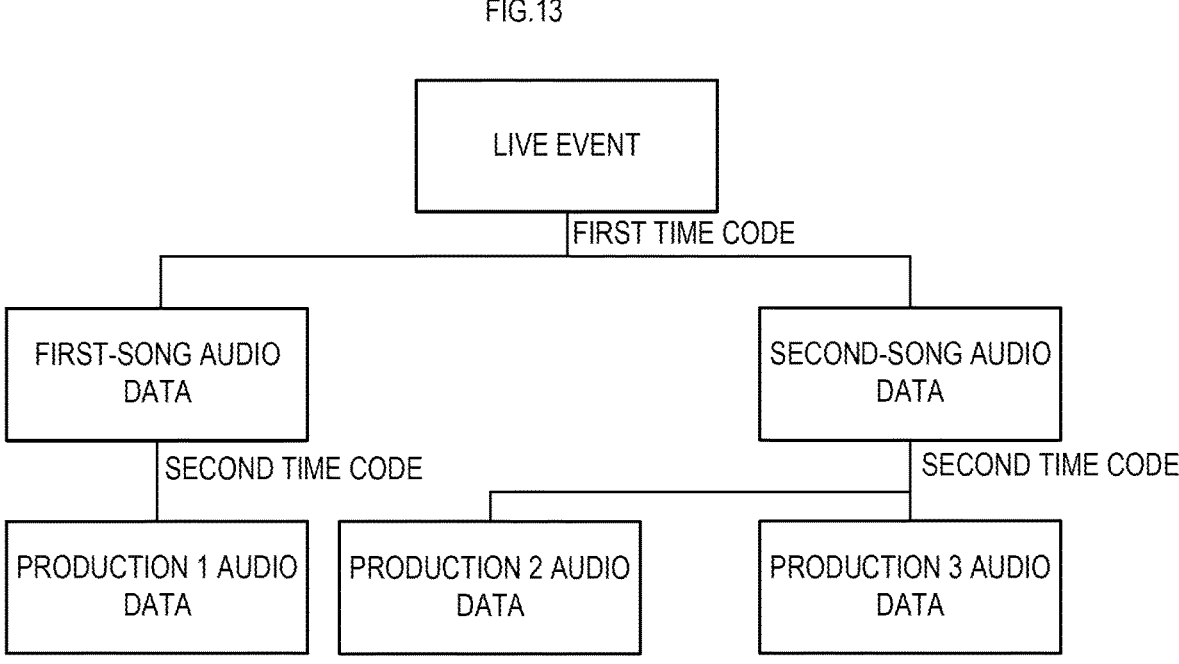
FIG. 13 is a conceptual diagram showing a hierarchical structure of the related information according to the application example.

The reproduction apparatus is able to receive a change in the related destination of the related information and change the related destination of the audio data, based on the received related destination. For example, a user of the reproduction apparatus, as shown in FIG. 12, changes the related destination of the audio data of the production 2 into the audio data of the second song. Then, as shown in FIG. 13, the audio data of the production 2 is changed into the lower layer of the audio data of the second song.

Accordingly, the audio data of the production 2 is reproduced at 00:01:40 from the reproduction start timing of the second song, and reproduction is ended at 00:02:40 from the reproduction start timing of the second song.

In this way, the related information according to the application example is recorded separately from the audio data. The reproduction apparatus does not need to edit the audio data, and, only by changing the related destination of the related information, can easily edit the reproduction timing of the audio data such as a production sound. In addition, when switching the order of songs, for example, the user of reproduction apparatus, as shown in FIG. 14, may change the start time and end time of the audio data of the first song and the start time and end time of the audio data of the second song. In this case, the related destination, start time, and end time of the production 1 and the production 2 being the lower layer of the first song are not changed. Therefore, even in a case in which the order of songs is changed, the reproduction timing of the audio data such as a production sound related to each song does not change.

The example of FIG. 9 through FIG. 14 shows an example in which the reproduction apparatus downloads the audio data in advance. However, the reproduction apparatus may download the audio data in real time from the venue of the live event. Hypothetically, even in a case in which the order of songs of the live event is changed, the related destination of the production sound and the start time of the second time code are distributed, so that the audio data such as a production sound is reproduced at appropriate timing. The operator who manages the live event may change the related destination of the audio data of the production sound according to progress of the live event.

The second time code may be not time information but musical time information. The musical time information is information on measure, beat, and tempo (BPM: Beats-Per-Minute), for example. Alternatively, the musical time information may include information that indicates a structure of a song such as an "Intro," "A Verse," "B Verse," "Chorus 1," or "Last Chorus." In this case, the second audio data or the third audio data such as a production sound is specified as to in which beat of which measure reproduction starts as the time information of the second time code.

As a result, the user of the reproduction apparatus or the operator who manages the live event can easily manage reproduction timing such as a production sound. For example, in a case in which the start timing of the audio data of the production 2 shown in FIG. 9 is the first beat of measure three of the second time code, hypothetically, even when the related destination of the audio data of the production 2 is changed into the audio data of the second song, the audio data of the production 2 is reproduced on the first beat of measure three of the second song. Alternatively, even when a player of the live event changes the tempo of the second song to a different speed from the original tempo, the audio data of the second song is always reproduced on the first beat of measure three of the audio data of the production 2. The operator who manages the live event can reproduce the production sound at the same musical timing, even when changing the related destination of the audio data of the production sound to a song with a completely different tempo according to the progress of the live event.

In addition, the content data processing apparatus the content data processing apparatus 10B, and the content data processing apparatus 10C, in a case of storing the audio data of the live event and also editing the live event that the user held in the past, are able to perform editing based on the musical time information. For example, the user, only by copying the production sound started at the top of Chorus of the first song to the top of Chorus of the second song, can reproduce the same production sound also at the top of Chorus of the second song.

Figure 15:
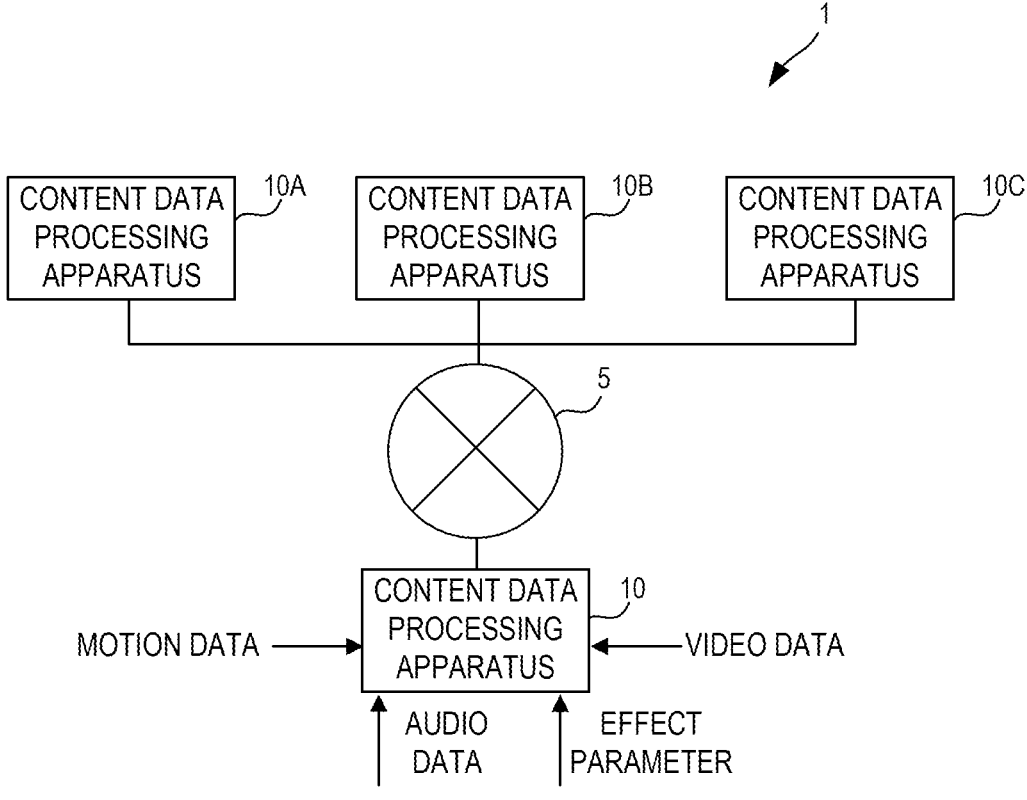
FIG. 15 is a block diagram showing a configuration of the content data processing system 1.

The data that the content data processing apparatus generates and the data to be distributed are not limited to audio data. In addition, the data that the content data processing apparatus 10A, the content data processing apparatus and the content data processing apparatus 10C reproduce is not limited to audio data. For example, as shown in FIG. 15, the data that the content data processing apparatus 10 generates and the data to be distributed include at least one of data of an effect parameter related to the audio data, video data of the live event, or motion data.

The effect parameter includes information on localization of a production sound, for example. In a case in which the second content data includes the data of an effect parameter, the reproduction apparatus, at a time specified by the second time code, reproduces a certain production sound (a sound of fireworks, for example) and localizes a position to which the sound of fireworks is assigned. Accordingly, the operator who manages the live event can generate the production sound at any timing of any song according to the progress of the live event and can localize the production sound at any position.

The video data includes not only video data obtained by capturing the entire live event but video data obtained by individually capturing a performer or a production image (a video of fireworks, for example) captured in advance. The operator who manages the live event generates the production video (the video of fireworks, for example) at any timing of any song according to the progress of the live event. The reproduction apparatus combines the production image with the video data of the live event to display on the display 101.

The operator, when further specifying and distributing an effect parameter, can also localize the production video at any position. In addition, the video data is not limited to the actual venue in which the live event is performed and may be pre-recorded video data of other venues. In addition, for example, the video data of the venue may change for each song. The video data may be computer graphics that imitate the video of the venue. The reproduction apparatus may synthesize a production video (a video of fireworks, for example) of computer graphics to the video data of the actual venue. In this case as well, the operator who manages the live event can reproduce the production image at specified timing of a specified song.

The effect parameter may also include information on space reverberation. The information on space reverberation may be a filter coefficient of a digital filter such as an FIR filter or may be information (information that indicates the size of a space, position information that indicates the shape of a wall surface, or information that indicates a sound absorption coefficient of a wall material or the like) that indicates the shape of a venue such as a concert hall. In addition, the effect parameter may include position information on a sound source of a singing sound, a performance sound, or the like. The reproduction apparatus may perform processing to localize the singing sound or the performance sound, based on the position information on the sound source. The reproduction apparatus may generate an indirect sound such as an early reflected sound or a reverberant sound of the venue, based on the information on space reverberation. The reproduction apparatus, by convoluting the filter coefficient into the audio signal of the audio data, for example, generates an indirect sound. Alternatively, the reproduction apparatus, based on the information that indicates the shape of the venue and the position information on the sound source, may calculate level and delay amount of the indirect sound that occurs in the venue and the lags behind a direct sound and may generate a pseudo indirect sound.

The information on space reverberation may relate to the video data of the venue. The content data processing apparatus 10 distributes the information on space reverberation corresponding to the video data of each venue. As the video data of the venue changes, the information on space reverberation also changes. Accordingly, the reproduction apparatus generates the indirect sound such as an early reflected sound or a reverberant sound according to a change in the venue.

The motion data is data according to position information (two-dimensional or three-dimensional position information) of a motion capture that the performer wears. The reproduction apparatus reproduces virtual character video, and, based on the motion data included in the second content data, changes character video according to progress of the time of the second time code. As a result, a video of the performer is replaced with the virtual character video. The operator who manages the live event can also change the character video, for example, between the performance of the first song and the performance of the second song, according to the progress of the live event. In this case, the second content data includes information to specify the character video.

The aggregation result of the above reaction data is applicable to production. For example, in a live event in which a certain production sound (a sound of fireworks) and a certain production image (a video of fireworks) are reproduced at certain timing of a certain performance, the content data processing apparatus 10, in a case in which the aggregated number of texts corresponding to a trend word is not less than a predetermined threshold value, distributes the production sound and the production image, and reproduces the production sound and the production image. The content data processing apparatus in a case in which the aggregated number of texts corresponding to a trend word is less than the predetermined threshold value, does not distribute the production sound and the production image or reproduce the production sound and the production image. Alternatively, the content data processing apparatus 10 may change the production sound and the production image according to the aggregated number of texts corresponding to a trend word. For example, the content data processing apparatus 10 may increase the number of sounds of fireworks and videos of fireworks as the texts corresponding to a trend word are increased. In addition, the production image may be a video of flying a silver tape on which the texts corresponding to a trend word are written.

The content data processing apparatus 10 may generate the production sound according to the position information. For example, the content data processing apparatus in a case in which excitement is detected on the east side of the position of the venue of the live event, may generate the production sound of a shout that localizes on the east side of the venue of the live event.

The content data processing apparatus 10 may generate the production sound and the production image according to the motion information. For example, the content data processing apparatus 10 aggregates the movement of the participants detected by the acceleration sensor of the penlight, and, in a case of determining that penlights of the number above a predetermined threshold value have moved, generates the production sound (the sound of fireworks) and a certain production image (a video of fireworks).

In addition, the reaction data may be color information detected by capturing the penlight of each participant with the camera of the mobile terminal owned by the user. In this case, the content data processing apparatus 10 generates the production image of fireworks according to the color of the penlight of the reaction data. For example, the content data processing apparatus 10 aggregates the reaction data and generates the production image of fireworks according to the most common colors.

In a case in which the reaction data includes biological information, the content data processing apparatus generates the production image of fireworks according to the biological information of the reaction data. For example, the content data processing apparatus 10 aggregates reaction data of a heart rate, and, in a case in which the aggregation result of the heart rate exceeds a threshold value, generates the large number of production sounds (the sound of fireworks) and a certain production image (a video of fireworks).

It is to be noted that the content data processing apparatus 10A, the content data processing apparatus 10B, and the content data processing apparatus 10C, by displaying the image of a penlight on the display 101 and detecting a touch operation to the image of the penlight, for example, may receive the motion information. In addition, the content data processing apparatus 10A, the content data processing apparatus and the content data processing apparatus 10C, by displaying a color image of a penlight on the display 101 and detecting a touch operation to the color image of the penlight, for example, may receive the color information.
(Modification 1)

The content data processing apparatus 10A, the content data processing apparatus 10B, and the content data processing apparatus 10C according to Modification 1 receive a reaction from a user, and the content data processing apparatus distributes a production sound corresponding to the received reaction.

That is to say, the content data processing method according to Modification 1 receives a specific reaction from the participant in the live event, generates the reaction data in which the musical time information is added as the second time code, and distributes the audio data corresponding to the reaction data, based on the second time code.

For example, the content data processing apparatus the content data processing apparatus 10B, and the content data processing apparatus 10C displays an icon image of "handclap" on the display 101, and, by receiving a selection operation to the icon image of "handclap" from a user through the user I/F 102, receives a handclap reaction. Alternatively, the content data processing apparatus 10A, the content data processing apparatus 10B, and the content data processing apparatus 10C may continuously receive the handclap reaction when receiving the selection operation of the icon image of "applause" at regular intervals. In particular, the content data processing apparatus 10A, the content data processing apparatus 10B, and the content data processing apparatus 10C, in a case of receiving the selection operation of the icon image of "applause" at intervals matching the rhythm (BPM) of content being reproduced, may receive the handclap reaction. It is to be noted that the tempo (BPM) of the content being reproduced may be obtained in analyzing the received content data or the content data processing apparatus 10 may distribute information that indicates the tempo (BPM) of the content.

The content data processing apparatus 10A, the content data processing apparatus 10B, and the content data processing apparatus 10C generate the information corresponding to the received reaction and generate the reaction data in which the second time code is added to the generated reaction information. The content data processing apparatus 10 receives the reaction data from the content data processing apparatus the content data processing apparatus 10B, and the content data processing apparatus 10C.

Figure 16:
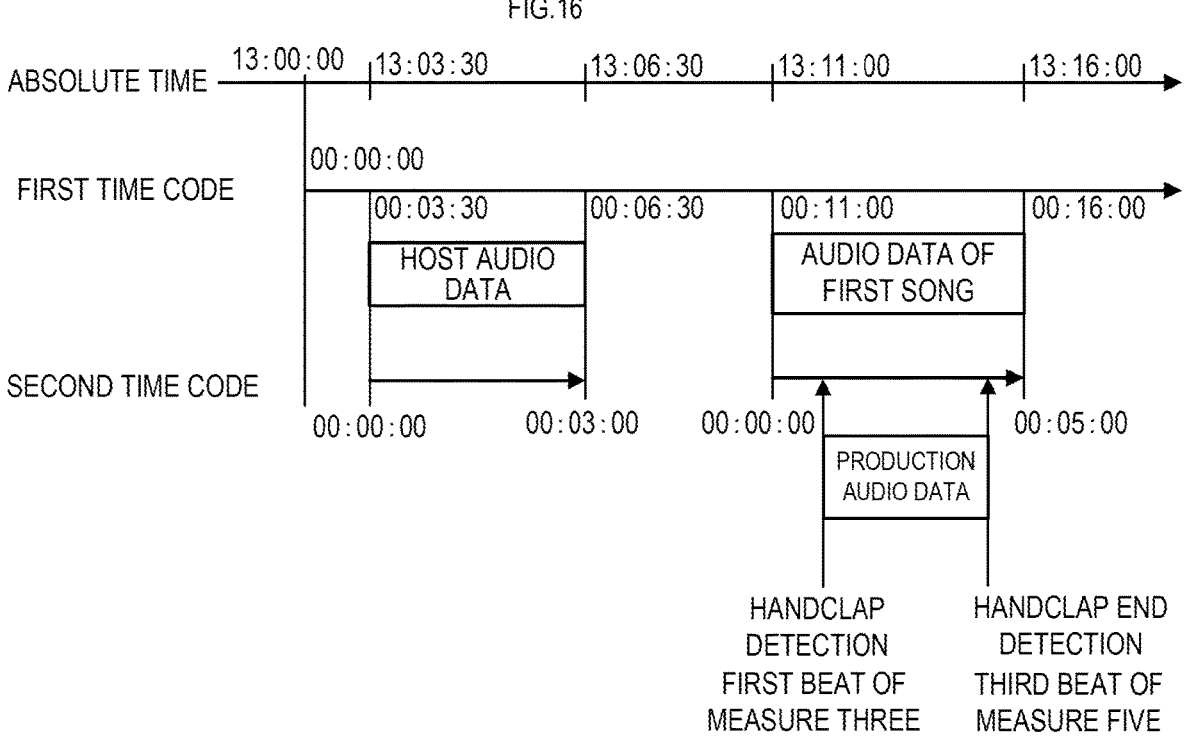
FIG. 16 is a view showing a relationship among a time code, audio data, and time according to Modification 1.

The content data processing apparatus 10 distributes the production sound corresponding to the received reaction, based on the second time code of the received reaction data. FIG. 16 is a view showing a relationship among a time code, audio data, and time according to Modification 1.

In this example, the second time code is not time information but musical time information. The content data processing apparatus 10A, the content data processing apparatus or the content data processing apparatus 10C generates the reaction data of "handclap" added with "first beat of measure three," for example, as the second time code to the performance of the first song.

The content data processing apparatus 10, when receiving the reaction data, distributes the production sound of "handclap." The content data processing apparatus 10A, the content data processing apparatus 10B, and the content data processing apparatus 10C reproduce the production sound of "handclap." Accordingly, all the users who listen to the audio data of the live event listen to the production sound of handclap. Then, hypothetically, when other users other than a user who has performed the reaction of "handclap" perform the reaction of "handclap" according to the production sound of the distributed handclap, further reaction data is sent to the content data processing apparatus 10. The content data processing apparatus distributes the production sound of "handclap," based on each received reaction data.

On the other hand, the content data processing apparatus 10A, the content data processing apparatus 10B, or the content data processing apparatus 10C, when detecting stop of the reaction of "handclap," generates the reaction data in which the second time code is added to the reaction information that indicates "handclap end". The content data processing apparatus when receiving the reaction data of "handclap end," stops distributing the production sound of "handclap."

As a result, the production sound corresponding to the reaction of the "handclap" by a large number of users is distributed. Therefore, the user can obtain experience as if clapping with other participants and can obtain a more immersive sense of the live event.

In addition, in this example, the second time code is musical time information. Therefore, even when different communication delays occur in each of the content data processing apparatus 10A, the content data processing apparatus or the content data processing apparatus 10C that is a distribution destination, the production sound of handclap is able to be reproduced at the same musical timing and at the same tempo. In addition, also when reproducing the audio data of the past live event, in any reproduction apparatus, the production sound of handclap is able to be reproduced at the same musical timing and the same tempo. However, a plurality of production sounds of "handclap" are preferably reproduced at slightly different timing at random. Accordingly, the user can listen to a more natural production sound of handclap.
(Modification 2)

The content data processing method according to Modification 2 obtaining each of a plurality of audio data according to a sound of a plurality of performers in the live event, records the plurality of obtained respectively added with the first time code or the second time code, receives a selection of any audio data among the plurality of recorded audio data, and reproduces the audio data that has received the selection, based on the first time code or the second time code that is added to the audio data that has received the selection.

Specifically, the content data processing apparatus according to Modification 2 first separately obtains the audio signal of the sound (the audio signal of a singing sound, the audio signal of a performance sound, and a production sound, for example) of the performer of each performance, and records the content data (the audio data for each performer) in which the first time code or the second time code is added to the audio data according to the obtained audio signal. The user of the reproduction apparatus (the content data processing apparatus 10A, the content data processing apparatus 10B, and the content data processing apparatus 10C) selects any audio data from the audio data for each performer. The reproduction apparatus reproduces the audio data selected based on the first time code or the second time code.

FIG. 17 is a view showing an example of the audio data that the content data processing apparatus 10 obtains in Modification 2. For example, in the first live event, the content data processing apparatus 10 obtains the audio signal of vocal 1 data, guitar 1 data, and bass 1 data of the first song. In addition, in the second live event, the content data processing apparatus 10 obtains the audio signal of vocal 2 data, guitar 2 data, and bass 2 data of the audio data of the first song. The first time code or the second time code is added to each data. The second time code may be time information or may be musical time information.

In each of the first live event and the second live event, the same song is played by different players. In the first song of the first live event, the first singer sings, the first guitar player plays the guitar, and the first bass player plays the bass. In addition, the same performer sings or plays the second song of the first live event. In the first song of the second live event being the same song as the song in the first live event, the second singer sings, the second guitar player plays the guitar, and the second bass player plays the bass. In the second song of the second live event, the third singer the same song as the second song of the first live event. As described above, the user of the content data processing apparatus 10A, the content data processing apparatus and the content data processing apparatus 10C can edit the audio data of the live event. The user of the content data processing apparatus 10A, the content data processing apparatus and the content data processing apparatus 10C according to Modification 2, can optionally select the sound (the audio signal of a singing sound, the audio signal of a performance sound, and the production sound, for example) of each live event and each performer and combine the audio data of any performer of any song of a plurality of live events.

FIG. 18 is a view showing an example of combination of the audio data. In this example, the user, for the first song, selects the audio data of vocal 1 in the first live event, selects the audio data of guitar 2 in the second live event, and selects the audio data of bass 2 in the second live event.

As described above, the first time code or the second time code is added to each data. The second time code may be time information or may be musical time information. With the musical time information, even when the user selects a different live event or a performance sound of a different player, the reproduction apparatus is able to play the audio data at the same musical timing and at the same tempo. The user of Modification 2, by selecting any performance of any performer of the plurality of live events, can create a user-specific live event by editing.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A content data processing method of processing at least one of audio or video data of a live event including a plurality of performances, the content data processing method comprising:
   generating first-time information indicating a relative time based on a first start timing of the live event;
   generating first content data by:
      receiving first data, which includes the one of the audio or video data, from corresponding to one performance among the plurality of performances of the live event; and
      adding, onto the first data, the first-time information as a header of the first content data, which includes a first start time and a first end time respectively corresponding to a reproduction start time and a reproduction end time of the one performance;

generating second-time information indicating a relative time based on a start timing of the one performance; and
   generating second content data by:
      receiving second data of another performance, among the plurality of performances, relating to the one performance; and
      adding, onto the second data, the second time code information as a header of the second content data, which includes a second start time and a second end time respectively corresponding to a reproduction start time and a reproduction end time of the second data in relation to the first data.

2. The content data processing method according to claim 1, further comprising distributing, to a content data processing apparatus:
   the first content data including the first-time information and the second-time information; and
   the second content data.

3. The content data processing method according to claim 1, further comprising generating related information indicating a relationship between the first content data and the second content data.

4. The content data processing method according to claim 3, further comprising:
   receiving a change in the relationship between the first content data and the second content data; and
   changing the relationship between the first content data and the second content data based on the received change in the relationship.

5. The content data processing method according to claim 1, wherein the first data includes audio data.

6. The content data processing method according to claim 5, wherein the second-time information includes musical time information.

7. The content data processing method according to claim 6, further comprising:
   receiving a specific reaction from a participant in the live event;
   generating reaction data from the participant's specific reaction, the reaction data including time information of the second-time information; and
   distributing the audio data corresponding to the reaction data based on the second-time information to a content data processing apparatus.

8. The content data processing method according to claim 1, wherein the first data includes video data.

9. The content data processing method according to claim 1, wherein the second data includes motion data.

10. The content data processing method according to claim 1, further comprising:
   obtaining a plurality of audio data associated with sound produced by a plurality of performers in the live event;
   recording the plurality of obtained audio data respectively added with the first-time information, or the respective second-time information associated with each of the plurality of obtained audio data;
   receiving a selection of any audio data among the plurality of recorded audio data; and
   reproducing the selected audio data based on the first-time information or the respective second-time information added to the selected audio data.

11. The content data processing method according to claim 1, further comprising:
   receiving a specific reaction from a participant in the live event; and generating reaction data from the participant's specific reaction, the reaction data including at least one of the first-time information or the second-time information.

12. The content data processing method according to claim 1, further comprising:

receiving reactions from a plurality of participants; and generating and aggregating a plurality of reaction data to be reproduced.

13. The content data processing method according to claim 1, wherein:

the second content data including third data, which is related to the first data, to which the first-time information with a third start time and a third end time is added, and the method further comprises reproducing the third data based on the second-time information.

14. A content data processing apparatus for processing at least one of audio or video data of a live event, the content data processing apparatus comprising:

a processor configured to:

generate first-time information indicating a relative time based on a first start timing of the live event;

generate first content data by:

receiving first data, which includes the one of the audio or video data corresponding to one performance among the plurality of performances of the live event; and adding, onto the first data, the first-time information as a header of the first content data, which includes a first start time and a first end time respectively corresponding to a reproduction start time and a reproduction end time of the one performance;

generate second-time information indicating a relative time based on a start timing of the one performance; and generate second content data by:

receiving second data of another performance, among the plurality of performances, relating to the one performance; and adding, onto the second data, the second time information as a header of the second content data, which includes a second start time and a second end time respectively corresponding to a reproduction start time and a reproduction end time of the second data in relation to the first data.

15. The content data processing apparatus according to claim 14, wherein the processor is configured to distribute, to another content data processing apparatus:

the first content data including the first-time information and the second-time information; and the second content data.

* * * * *